United States Patent
Voigt et al.

(10) Patent No.: US 9,631,966 B2
(45) Date of Patent: Apr. 25, 2017

(54) FILL LEVEL MONITORING SYSTEM AND FLOW MEASURING DEVICE

(71) Applicant: Endress+Hauser Flowtec AG, Reinach (CH)

(72) Inventors: Frank Voigt, Weil am Rhein (DE); Werner Wohlgemuth, Seewen (CH); Gunther Bahr, Therwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 198 days.

(21) Appl. No.: 14/432,615

(22) PCT Filed: Sep. 19, 2013

(86) PCT No.: PCT/EP2013/069438
§ 371 (c)(1),
(2) Date: Mar. 31, 2015

(87) PCT Pub. No.: WO2014/053324
PCT Pub. Date: Apr. 10, 2014

(65) Prior Publication Data
US 2015/0241260 A1    Aug. 27, 2015

(30) Foreign Application Priority Data

Oct. 1, 2012 (DE) .................. 10 2012 109 308

(51) Int. Cl.
*G01F 23/00* (2006.01)
*G01F 25/00* (2006.01)
(Continued)

(52) U.S. Cl.
CPC .............. *G01F 23/00* (2013.01); *G01F 1/584* (2013.01)

(58) Field of Classification Search
CPC ........................................................ G01F 23/64
See application file for complete search history.

(56) References Cited

U.S. PATENT DOCUMENTS 5,105,661 A * 4/1992 Sekita ................... B29C 47/883
141/95
5,503,026 A    4/1996 Bohm
(Continued)

FOREIGN PATENT DOCUMENTS

DE        4116355 A1    11/1992
DE    102005005295 A1     6/2006
(Continued)

OTHER PUBLICATIONS

International Search Report, EPO, The Netherlands, Jan. 16, 2014.
(Continued)

*Primary Examiner* — Joseph Feild
*Assistant Examiner* — Pameshanand Mahase
(74) *Attorney, Agent, or Firm* — Bacon & Thomas, PLLC (57) ABSTRACT

A fill level monitoring system comprising at least one electrode for monitoring the fill level of a medium flowing in a pipe or tube, wherein the electrode has an integrated temperature sensor, wherein the fill level monitoring system further comprises an evaluation unit, which is embodied for monitoring the degree of filling of the pipe or tube and transmits a warning signal when the degree of filling subceeds a limit value, preferably a degree of filling of less than 80% of the tube diameter; and a flow measuring device having this fill level monitoring system.

2 Claims, 4 Drawing Sheets

(51) Int. Cl.
*B60Q 1/00* (2006.01)
*G01F 1/58* (2006.01)

(56) References Cited

U.S. PATENT DOCUMENTS

| | | | | |
|---|---|---|---|---|
| 5,798,698 A * | 8/1998 | Politt | ............... | G01F 23/0076 340/618 |
| 6,016,697 A * | 1/2000 | McCulloch | ........... | G01F 23/266 73/304 C |
| 2011/0090088 A1* | 4/2011 | Kenney | ............... | G01F 23/68 340/623 |

FOREIGN PATENT DOCUMENTS

| | | |
|---|---|---|
| DE | 102007005670 A1 | 8/2008 |
| DE | 102009046653 A1 | 5/2011 |
| DE | 102010001993 A1 | 8/2011 |
| EP | 1387148 A2 | 2/2004 |
| JP | 2002107203 A | 4/2002 |

OTHER PUBLICATIONS

German Search Report, German Patent Office, Munich, DE, Mar. 21, 2013.
English Translation of the International Preliminary Report on Patentability, WIPO, Geneva, CH, Apr. 16, 2015.

* cited by examiner

FILL LEVEL MONITORING SYSTEM AND FLOW MEASURING DEVICE

TECHNICAL FIELD

The present invention relates to a fill level monitoring system and to a flow measuring device.

BACKGROUND DISCUSSION

Fill level monitoring systems for flow measuring devices are known. For instance, a measured substance monitoring electrode (MSM electrode) in the case of horizontal installation is arranged with reference to the cross section of the measuring tube at the uppermost point thereof. By determining the electrical resistance or the conductivity between the MSM electrode and the medium, derived e.g. via a reference electrode or a metal process connection in contact with the metal housing of the flow measuring device, the contact between MSM electrode and medium and, thus, the complete filling of the tube is monitored. In such case, the medium has compared with air always a higher conductivity. If the conductivity sinks below a predetermined limit, then a partial filling is detected. The limit is dependent on, among other things, the specific conductivity of the medium, the nominal diameter, the size and position of the MSM electrode as well as the properties of the measuring tube lining. Therefore, depending on application, a calibration is required for determining the limit.

Moreover, temperature sensors are known, which are applied in flow measuring devices. Already known, for example, are German Patent, DE 10 2009 0046 653 A1, European Patent, EP 1 387 148 A2 and German Patent DE 10 2007 005 670 A1, in which temperature sensors are applied and utilized in measuring electrodes of an MID. These sensors serve, however, not for fill-level monitoring of a high degree of filling but, instead, only give a warning signal, when in the case of horizontal installation and horizontal connecting axis of the measuring electrodes, the degree of filling in the pipe sinks below 50%. This could be achieved, when the connecting axis of the measuring electrodes in the installation is vertically oriented. Disadvantageous, in such case, however, is the influencing of measuring performance by small gas bubbles in the medium, which flow along the inner upper side of the measuring tube.

SUMMARY OF THE INVENTION

Starting from this state of the art, it is an object of the present invention to provide a fill level monitoring system, which permits the ascertaining of further physical variables of a measuring system and at the same time provides a compact construction.

According to the invention, a fill level monitoring system includes at least one electrode for monitoring the fill level of a medium in a pipe, wherein the electrode has additionally an integrated temperature sensor.

The temperature sensor integrated in the electrode enables ascertaining the temperature of the medium in a pipe. This can be preferably a measuring tube or a process connection in a flow measuring device. Additionally, the invention can also be applied for fill-level monitoring anywhere where the additional ascertaining of the temperature of the medium could be relevant, for example, in the case of conductive media, such as, for example, water, drinks, foods, cleaning agents or vaccine solutions.

The fill level monitoring system includes an evaluation unit, which is embodied for monitoring the degree of filling of the tube and transmits a warning signal, when the degree of filling subceeds a limit value, preferably a degree of filling of 55% of the tube inner diameter. For all degrees of filling below 55%, thus a warning signal is output.

Especially preferably, a warning signal can already be given, when the degree of filling falls below 75%, preferably below 95%, especially below 98%, of the tube inner diameter. This assumes, however, a positioning of an MSM electrode or a reference electrode in the upper region of the tube.

Additionally, an option is to combine a fill-level monitoring and temperature measurement, in order not only to indicate a subceeding of the fill level with relevance for the flow measurement, but, instead, especially to detect that the temperature electrode is no longer in the contact with the medium. If this is the case, then a greater measurement error can occur, which can be forwarded in the form of a warning report to the user. Thus, the temperature measurement function profits from the fill-level monitoring.

The fill level monitoring system operates advantageously using the conductivity of the medium. In such case, the fill level monitoring system includes at least one circuit for applying a voltage profile between first and second electrodes. The medium provides the contacting between the two electrodes and is effective in the case of contact with the two electrodes, thus completing the electrical circuit.

In the case of insufficient degree of filling, this is not the case, whereupon a warning signal is output.

In a preferred embodiment, both of the first and second electrodes have integrated temperature sensors. These are preferably the reference electrode as well as also the MSM electrode. In this way, the temperature can be determined at two locations. In the case of different temperatures, it is possible under certain conditions to derive information concerning the time-dependent flow profile in the case of complete pipe filling. Alternatively, the reference electrodes can also confirm an incomplete degree of filling in the case of a sufficient temperature difference between the medium and the ambient temperature.

An especially preferred electrode form for an improved temperature response time is provided when the electrode has an electrode head, which has an end face with a midpoint and at least a first region spaced radially therefrom, wherein at least the first region defines a first circular arc bulged in the direction of the medium or a parabola bulged in the direction of the medium. In such case, the electrode head is rotationally symmetrically constructed with a longitudinal axis. In such case, the first region extends over a section extending radially toward the midpoint by at least 2%, preferably 4%, especially 10% of the diameter of the electrode head.

Temperature response behavior can be further improved by the advantageous arrangement of the midpoint of the end face at a separation in the direction of the medium from the circular arc or the parabola. This separation is preferably greater than 1% of the diameter of the electrode head, especially greater than 5% of the diameter of the electrode head, especially greater than 8% of the diameter of the electrode head.

Especially advantageous is an embodiment of an electrode head, in the case of which the course of the end face in the radial direction toward the midpoint reaches a point, from which an extension in the direction of the medium occurs with a positive slope, wherein the separation of this point from the midpoint in the longitudinal axis direction is greater than the wall thickness of the electrode head along the longitudinal axis at the midpoint of the electrode. This length to wall thickness ratio provides an especially rapid response to temperature changes.

Direction of the medium means in this connection that, to the extent that the temperature sensor is arranged perpendicularly in a pipe or tube with a longitudinal axis or another cylindrical containment with a longitudinal axis, the direction of the medium extends orthogonally to this longitudinal axis toward the pipe, respectively tube or containment, interior. The direction of the medium, thus, extends toward the medium.

Figure 9:
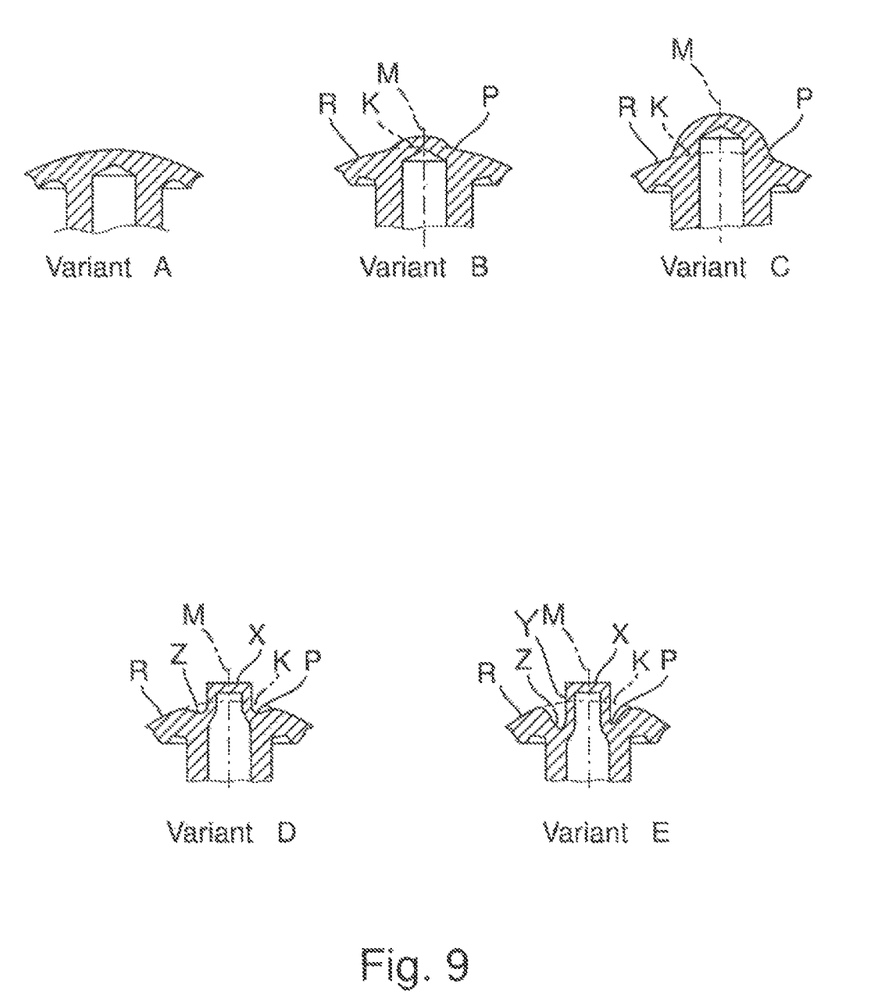
FIG. 9 is a schematic representation of a plurality of further variants of electrodes of the invention.

An especially advantageous design is, in such case, one in which a front section of the electrode head is embodied as a cylindrical molding, whose cylinder wall extends parallel to the longitudinal axis of the electrode; for this, reference is made to the variants of FIG. 9 of the drawing.

In such case, the evaluation unit is so designed that it can determine both the temperature of the medium as well as also the accretion state of the electrode as well as also the fill state of the tube. Individualized evaluation units are, thus, not necessary, and this leads to a lessening of the space requirement of the fill level monitoring system. Additionally, by combining a fill-level monitoring and temperature measurement, not only a subceeding of the fill level with relevance for the flow measurement can be displayed, but also it can especially be detected that the temperature electrode is no longer in contact with the medium. If this is the case, then a greater measurement error can occur, concerning which a user can be informed by way of a warning report. Thus, the temperature measurement function profits from the fill-level monitoring.

Especially, it is very advantageous to detect by evaluating the signal of the MSM electrode whether the temperature sensor integrated in the MSM electrode is still in direct contact with the medium. Direct contact means here that the electrode, in which the temperature sensor is integrated with direct contact to the electrode, is accretion free and the electrically conductive regions of the electrode outside of the lining are in contact with the medium. By an electrically insulating and thermally conductive coating of a part of the electrode, the MSM can already respond, as soon as the medium contacting electrode surface is less than 20%, advantageously less than 50%, especially less than 90%. If the electrode is to a lesser degree or especially no longer in direct contact with the medium, this can lead to a greater measurement error of the temperature, which can be recognized by evaluation of the fill level- and accretion detection function. In the case of detecting this case, an option is to provide in the shared evaluation unit corresponding measures, especially to output a warning report relative to the accuracy of the temperature measurement.

The fill level monitoring system can in advantageous manner be embodied such that the evaluation unit has a display element for displaying the temperature of the medium and/or the accretion state of the electrode and for display of the fill state of the tube or pipe. The display unit enables simple readability and, in given cases, on-site monitoring or control of process conditions of a plant based on the parameters ascertained with the electrode.

It is advantageous when a first end portion of the sensor head has an electrically insulating coating and a second end portion is coating free. In such case, the first end portion protrudes preferably farther into the pipe than the second end portion. The sensor shows a sufficient degree of filling as a function of how far the sensor—respective the sensor head—protrudes inwardly into the pipe or tube. In order to provide an early warning signal, thus even in the case of greater degrees of filling, the sensor head includes an insulating coating for the first portion. That means that as soon as the medium sinks below the border of the coating, a warning signal is triggered.

According to the invention, a flow measuring device includes a measuring tube and an apparatus for ascertaining the flow velocity and/or volume flow of a medium in the measuring tube, wherein the flow measuring device has a fill level monitoring system, which fill level monitoring system has at least one electrode with an integrated temperature sensor, which electrode is arranged in the measuring tube or in a process connection connected to the measuring tube.

The fill level monitoring system includes an evaluation unit, which is embodied for monitoring the degree of filling of the tube and transmits a warning signal, when the degree of filling subceeds a limit value, preferably a degree of filling of 55% of the tube inner diameter. Especially preferably, a warning signal can already be issued when the degree of filling falls below 80% of the tube inner diameter, preferably below 95% of the tube inner diameter, especially below 98% of the tube inner diameter. For this, there occurs preferably a positioning of an MSM electrode or a reference electrode in the upper region of the tube in the case of a horizontal installed position.

The flow measuring device can especially be embodied as a magneto inductive flow measuring device, wherein supplementally to the measuring electrodes arranged in the measuring tube, at least one electrode associated with the fill level monitoring system is present.

BRIEF DESCRIPTION OF THE DRAWINGS

The invention will now be described in greater detail based on preferred examples of embodiments presented in the drawing, the figures of which show as follows.

DETAILED DISCUSSION IN CONJUNCTION WITH THE DRAWINGS

Figure 1:
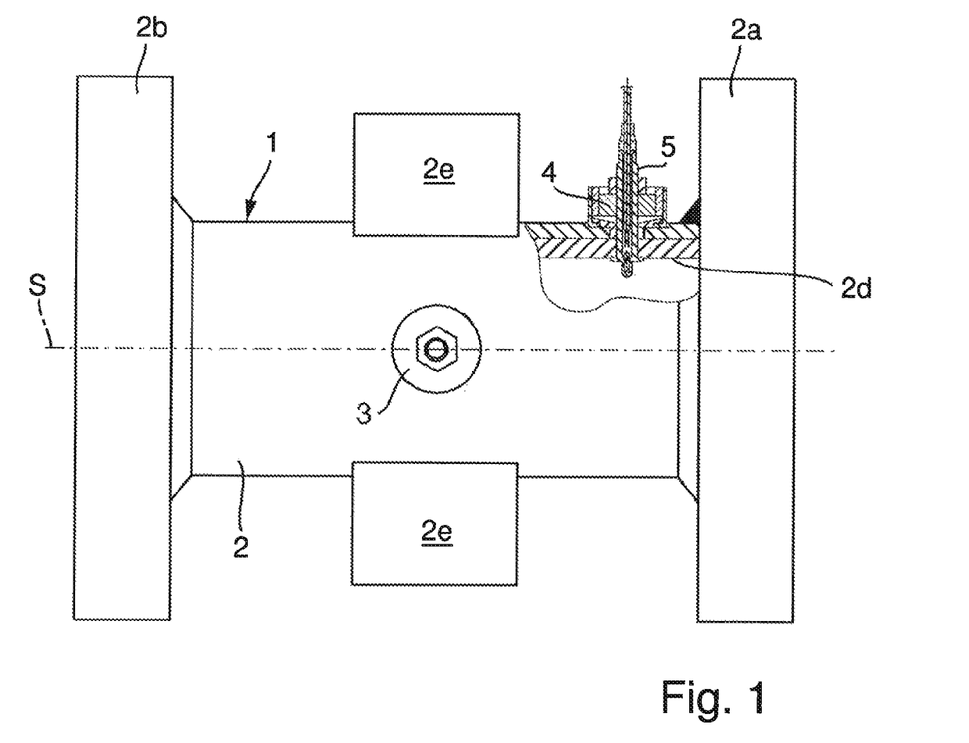
FIG. 1 is an arrangement of a first electrode of the invention in the measuring tube of a magneto inductive flow measuring device.

The measuring principle of a magneto inductive flow measuring device 1, such as that shown in FIG. 1, is basically known. According to Faraday's law of induction, a voltage is induced in a conductor moving in a magnetic field. Here, the flowing measured substance corresponds to the moved conductor. A magnetic field is produced by two field coils $2e$ on both sides of a measuring tube 2. Perpendicularly thereto on the tube inner wall of the measuring tube are two measuring electrodes 3, which sense the voltage produced when the measured substance is flowing. The induced voltage is proportional to the flow velocity and therewith to the volume flow. The magnetic field produced by the field coils results from a clocked direct current of changing polarity. This assures a stable zero-point and makes the measuring insensitive relative to influences of multiphase materials, inhomogeneity in the liquid or lesser conductivity. Known are magneto inductive flow measuring devices with coil arrangements with more than two field coils and other geometrical arrangements.

The examples of embodiments shown in FIGS. 1-9 will now be described in greater detail.

FIG. 1 shows a measuring tube 2 with a measuring tube wall embodied rotationally symmetrically about a horizontal measuring tube axis S for a flow measuring device 1 of the invention, which in the concrete example of an embodiment is embodied as a magneto inductive flow measuring device. Measuring tube 2 includes two flanges 2a, 2b, which enable insertion into a pipeline. Arranged within the measuring tube is an anchoring 2c, on and in which is applied facing toward the measured medium a plastic lining in the form of a liner 2d. The outer wall of the measuring tube includes above and below the measuring tube axis a magnet system 2e. The magnet system produces during operation of the magneto inductive flow measuring device a magnetic field perpendicular to the measuring tube axis S. Arranged in the case of horizontal installation at height equal to that of the measuring tube axis S are two measuring electrodes 3, which are diametrally opposed and during operation sense a voltage produced in the measured medium. To the extent that volume flow should be measured, it is especially important that the filling of the measuring tube 2 be as complete as possible. Therefore, arranged in line with the measuring tube axis in the case of horizontal installation at the highest point of the inner diameter of the measuring tube 2 is an electrode 4 of a fill level monitoring system. In the present case, electrode 4 is embodied as a measured substance monitoring electrode, i.e. an MSM electrode for short. This extends through the liner 2d, as well as the metal measuring tube wall, and is secured on the outer wall of the measuring tube 2 facing away from the medium. Arranged within the MSM electrode is a temperature sensor in the form a resistance thermometer.

Figure 2:
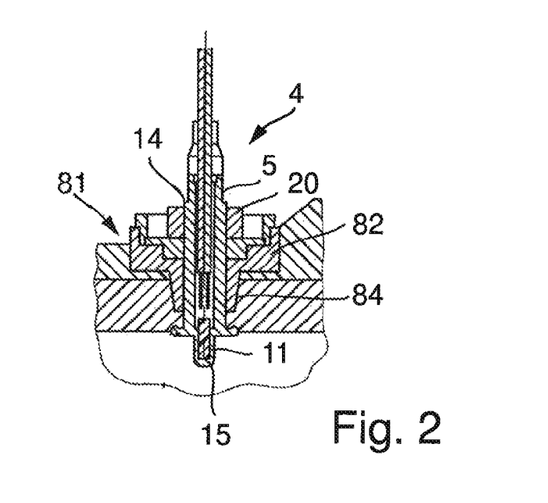
FIG. 2 is a detail view of the first electrode of the invention in the installed state.
Figure 5:
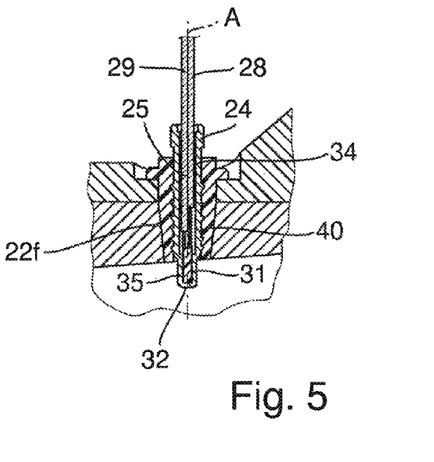
FIG. 5 is a detail view of the second electrode of the invention in the installed state.

FIGS. 2 and 5 show different securement variants for securing the MSM electrode 4 in the tube wall of the measuring tube 2.

FIG. 2 shows a securement apparatus 81 for securing the MSM electrode 4. This securement apparatus 81 includes a multipart, rotationally symmetric housing 82 having a housing longitudinal axis. Housing 82 sits on the wall of the measuring tube and is fixed thereto.

Electrode 4 has a rotationally symmetric, electrode body 14 and a rotationally symmetric, electrode head 15 with a midpoint M and a longitudinal axis A. Arranged on the electrode body 14 is a screw thread, which a coupling nut 20 can engage. The electrode includes additionally on the electrode head a preferably radially surrounding, sealing strip, respectively a material protrusion or protuberance, which extends in the radial direction from the midpoint M beyond the diameter of the electrode body 14.

The metal electrode body of the MSM electrode serves, in such case, as housing of the resistance temperature sensor. The terms electrode body and electrode head stand, consequently, in the context of this invention, synonymously for the terms housing body and housing head.

In tightening the coupling nut 20, a longitudinal axis pulling force is exerted on the electrode 4, which is directed radially from the measuring tube axis S. Electrode 4 follows this movement until the material protrusion bears on the inner wall of the measuring tube 2 and a counterforce opposing the pulling force forms. In such case, the material protrusion engages on its side facing away from the face of the electrode head 15 in the liner, so that in the case of tightening of the coupling nut 20 a sealing of the electrode 4 is achieved.

In the case illustrated in FIG. 2, the securement apparatus comprises a one-piece, rotationally symmetric housing 82 which protrudes inwardly into the measuring tube wall. This securement apparatus has a compact construction.

Figure 3:
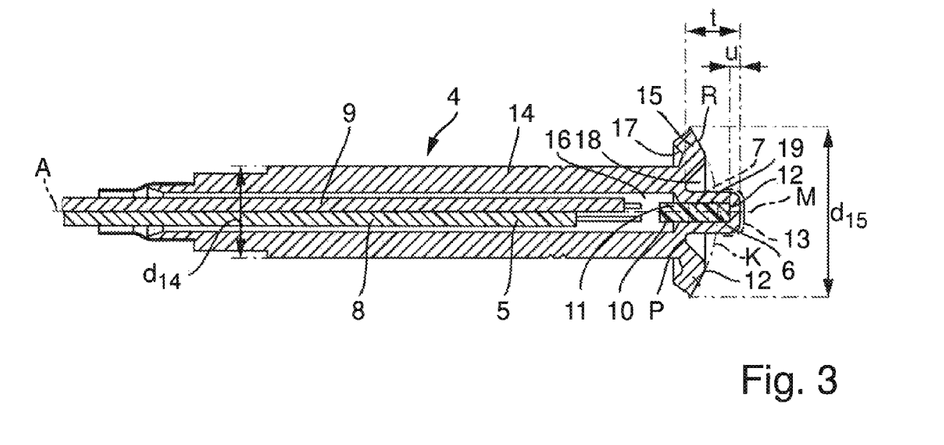
FIG. 3 is a detail view of the first electrode of the invention in the deinstalled state.

FIG. 3 shows a detail view of a first embodiment of an electrode, such as the MSM electrode in FIGS. 1 and 2.

Figure 4:
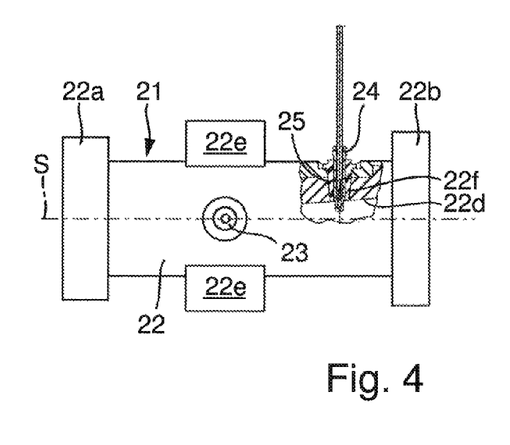
FIG. 4 is an arrangement of a second electrode of the invention in the measuring tube of a magneto inductive flow measuring device.

FIG. 4 shows a second preferred embodiment of a flow measuring device of the invention, which is embodied as a magneto inductive flow measuring device 21, with an electrode, which can be applied in a fill level monitoring system of a pipe or tube.

Figure 6:
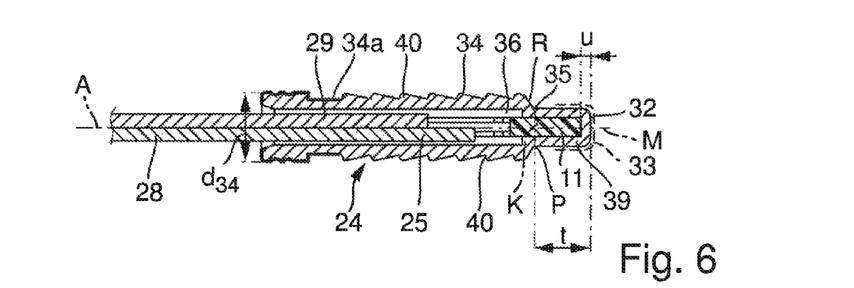
FIG. 6 is a detail view of the second electrode of the invention in the deinstalled state.

This electrode, which is shown in detail in FIG. 6, can be applied especially for flow measuring devices with measuring tubes having small nominal diameters lying preferably at DN≤25.

The magneto inductive flow measuring device 21 shown in FIG. 4 includes a measuring tube 22 having a rotationally symmetric internal tube wall and a horizontal measuring tube axis S. Measuring tube 22 includes asymmetrically embodied, terminal, tube flanges 22a and 22b. While a first tube flange 22a has a broad, cylindrical, basic form, a second tube flange 22b converges horizontally conically in the direction of the measuring tube center. Measuring tube 22 includes, such as in the case of the measuring tube already shown in FIG. 1, a measuring tube wall, which is composed of metal, preferably stainless steel. The inner wall of the measuring tube includes additionally a liner 22d, which in FIG. 2 extends through a bore 22f of FIG. 4 extending perpendicular to the measuring tube axis S out to the outer wall of the measuring tube 22. The measuring tube includes additionally two magnet systems 22e arranged diametrally opposite one another perpendicular to the measuring tube axis S for accommodating pole shoes of a coil arrangement, with which a magnetic field is produced extending vertically perpendicular to the measuring tube axis S. Arranged on a level with the measuring tube axis are two measuring electrodes 23 diametrally opposite on the two sides of the measuring tube 22. Arranged in the vertical bore 22f in the measuring tube 22 is an MSM electrode 24 having a temperature sensor 25.

FIG. 5 shows a detail view of the positioning of the electrode 24 in the measuring tube 22. Electrode 24 is rotationally symmetrically constructed with a longitudinal axis A and includes an electrode body 34 and an electrode head 35. The electrode body 34 includes lateral grabbing ledges 40, which lead away from the longitudinal axis A. These ledges engage in the liner material in the bore 22f of the measuring tube 22 and assure a stable positioning of the electrode 24 in the measuring tube 22. Arranged in the electrode is a temperature sensor 25 having a sensor platform 31. Sensor platform 31 is arranged on the inside of the electrode 24 along an inner wall section of the electrode, whose outer wall forms the end of the electrode head 15 of FIG. 3.

The electrode 4 of FIG. 3 with the specially formed electrode head 15 will now be explained in greater detail.

The special electrode form of FIG. 3 provides a better temperature response behavior and can be adapted and optimized both for the MSM electrode and the reference electrode as well as also for measuring electrodes.

The electrode 4 shown in FIG. 3 has a pin-shaped, respectively cylindrical, electrode body 14 and an electrode head 15. In such case, the electrode 4 is embodied rotationally symmetrically about its longitudinal axis A. Electrode 4 includes additionally an inner, rotationally symmetric, cylindrical, hollow space 16, which extends to the electrode head 15. Terminally arranged in this cylindrical hollow space 16 is a sensor platform 11 of the temperature sensor 5 in the form of a resistance thermometer, which can comprise, for example, a composite of a platform 6, a metal wire 7 and a protective layer 10, so that the temperature of a medium on an end face 12 of the electrode head 15 is forwarded via the material wall of the end face 12 directly to the temperature sensor 5, respectively the sensor platform 11.

FIG. 3 shows the electrode 4 with a preferred end surface geometry, respectively geometry of an electrode head. The end face includes a first lateral, preferably peripheral, edge section R, whose curvature defines a first circular arc K or a parabolic curve. In such case, the course of the end face of the electrode head does not follow the shape of the circular arc A defined by the edge section R. This first circular arc K is established by the radial curvature of the edge section R toward the midpoint M of the end face 12, especially by its beginning rise, whereas the midpoint M of the end face 12 is arranged in the longitudinal direction of the electrode 4 beyond this first circular arc K. In other words, the midpoint M of the end face 12 protrudes beyond the circular arc K. The angle α of the circular arc K amounts, in such case, to preferably less than 170°, preferably equal to or less than 160°, in order to achieve a favorable flow behavior of the medium. The course of the end face 12 radially toward the midpoint M reaches, in such case, a point P, after which an extension of positive slope occurs, wherein the separation t of the point P from the midpoint M in the longitudinal axis direction is greater than the wall thickness u of the electrode head 15 along the longitudinal axis A at the midpoint M of the electrode 4, respectively the end face 12.

The edge region or edge section R extends, in such case, preferably over a section extending radially toward the midpoint M of at least 2%, preferably at least 4%, especially at least 10%, of the diameter $d_{15}$ of the electrode head 15. Especially preferably, the edge section R amounts to between 2-70%, especially between 10-60%, of the diameter $d_{15}$ of the electrode head 15.

For reasons of perspicuity, the radial course of the end face will be described in greater detail based on the essentially equally-constructed variant E of FIG. 9. About after a third of the distance between the outermost lateral point of the end face 12 and the midpoint M of the end face 12, the end face 12 deviates from the shape of the first circular arc K in such a manner that a second section Z of the end face 12 is arranged in longitudinal axis direction below the circular arc K. In this second section, the end face has up to a point P a negative rise from the midpoint, respectively a negative slope. At the point P, the second section of the end face then transfers into a third section Y with a positive rise, and, finally, in a fourth section X, its course up to the midpoint defines a planar area.

The end surface form of the electrode of variant E of FIGS. 9 and 3 has, thus, a lateral section R in the form of a shoulder, then an annular groove Z and, finally, in the center a cylindrical shape Y and X.

The electrode form of variant E shown in FIG. 9, which corresponds to the example of an embodiment of FIG. 3, is distinguished, compared with the other variants of electrode shapes shown in FIG. 9, by an especially good measuring performance, especially as regards temperature response behavior and the attainable accuracy of temperature measurement at equilibrium.

The end face 12 of the electrode head 4 is, in such case, preferably compared with the diameter $d_{14}$ of the electrode body 14 at least 1.2-times wider, preferably at least 1.5-times wider, especially preferably at least 1.7-times wider.

The electrode head includes an annular sealing strip, respectively material protuberance or protrusion, which extends in the radial direction beyond the wall of the pin-shaped cylindrical electrode body 14. The upper side of the annular material protrusion 16 forms, in such case, a part of the terminal end face 12 of the electrode. The underside of the annular material protrusion includes a groove 17. The groove 17 enables a partial material take-up of the liner material arranged on the measuring tube inner wall of the magneto inductive flow measuring device, whereby a sealing action is achieved and a penetration of the medium to be measured into the region between the electrode body 14 and the measuring tube 2 is prevented. The opening breadth, thus the maximum separation of the two edges of the groove 17 amounts to preferably between 2-20% of the diameter $d_{14}$ of the electrode body, especially preferably 5-10% of the diameter $d_{14}$ of the electrode body.

The end includes also an annular groove 18. The means that the end has a portion, which is arranged below the circular arc K defined by the first edge section and toward the electrode body 14. Annular groove 18 provides flow guidance, which improves the temperature response of the resistance thermometer 5 arranged in the electrode 4. The annular groove 18 can, in such case, preferably be greater than 1%, especially preferably greater than 3%, of the diameter $d_{14}$ of the electrode body 14.

Included in the center of the electrode head 12 is a cylindrical structure 19, wherein the cylindrical surface extends parallel to the longitudinal axis of the electrode body. An internally situated base of the cylindrical structure is preferably flat, at least in certain regions, and extends perpendicular to the longitudinal axis of the electrode body. This has proved to be especially favorable, in order to achieve an as sealed as possible bonding between the temperature sensor, respectively the sensor platform, and the wall in the region of the cylindrical structure 19. This base is preferably arranged in the direction of the medium above the first circular arc K, which is defined by the edge region R of the end 12 of the electrode head 14. The sensor platform 11 within the temperature sensor, respectively the electrode, can have different forms. Thus, it can have, for example, a cylindrical shape, a rod shape with square cross section or a conical shape. The wall thickness u of the electrode head in the region of the cylindrical structure amounts to preferably less than the inner diameter of the cylindrical structure, preferably less than 50% of the inner diameter of the cylindrical structure, especially between 10 and 40% of the inner diameter of the cylindrical structure. This small wall thicknesses means an improved temperature transfer to the resistance thermometer, wherein the wall thickness at the same time offers sufficient mechanical protection of the resistance thermometer.

The wall thickness u is preferably both in the region of the cylindrical shaft as well as also in the region of the terminal circular area of the cylindrical structure 19 within a tolerance range of 15% essentially equally large, so that in the region of the cylindrical shaft a more favorable heat transfer is provided. This small wall thicknesses provides an improved heat transfer to the resistance thermometer, wherein the wall thickness offers at the same time sufficient mechanical protection of the resistance thermometer.

In such case, the inner diameter of the cylindrical structure is preferably less than the inner diameter of the electrode body 14, especially preferably at least around 1.2-times less, especially at least around 1.5-times less than the inner diameter of the electrode body 14.

Adjoining the electrode head 15 is the cylindrical electrode body 14. This has a cylinder wall in certain regions with a wall thickness which is preferably less than the inner diameter of the electrode body $d_{14}$, especially preferably less than 50% of the inner diameter of the electrode body.

The electrode body 14 has a front region, which directly opens into the electrode head and a rear region, which preferably protrudes out of the measuring tube 2. In this rear region, especially the outer wall of the electrode body includes a connection location (not shown in greater detail) for removing a signal. This can be, for example, a solder contact location, which enables connection of a cable, which is connected with an evaluation unit (not shown), which evaluates the received or applied voltage or electrical current level and, as a result, outputs a status signal concerning the fill state of the measuring tube. This occurs in interaction with a second electrode. The contacting of the two electrodes occurs via the medium in the case of sufficient fill state.

The electrode material of the aforementioned examples of embodiments is preferably steel.

Arranged in the interior of the electrode in the region of the electrode head 14 is the sensor platform. Alternatively or supplementally, the sensor platform 11 can also through use of a heat conductive paste be arranged on the inner wall of the cylindrical structure. This heat conductive paste guards especially against insulating air between the layer 11 and the inner wall of the cylindrical structure 19 of the electrode head 14.

Alternatively, the sensor platform can be arranged and held in the center of the electrode head 14 by a press-fit with the inner wall of the cylindrical structure 19.

As shown in FIG. 3, electrical power supply and electrical sensing occurs by way of metal wires. These extend in the longitudinal direction through the inner space of the electrode body to the outside and are to be insulated from one another.

Arranged on the end of the electrode body is a cable guide for centering and for protecting the cable.

The electrode 4 shown in FIG. 3 and applied as a measured substance monitoring electrode (MSM electrode) enables, thus, simultaneously the ascertaining of the temperature of the medium, wherein the electrode 4 at the same time forms the sensor housing of the temperature sensor 5. MSM electrodes are usually applied to detect an unfavorable, partial filling of a measuring tube. Such a partial filling of a measuring tube occurs, for example, in the case of measured substances that outgas or in the case of applications with fluctuating process pressure, leakages or purposeful emptying of the line.

Arranged in the flow measuring device of the invention of FIGS. 1 to 6 in an MSM electrode 4, 24 with an electrode body 14, 34 and an electrode head 15, 35 is a temperature sensor 5, 25 in the form a resistance thermometer, which will be explained below in greater detail as it is shown in the preferred embodiment of FIG. 3.

Fundamentally, the resistance value of the installed resistance thermometer can be selected as a function of the measuring tube diameter and, in given cases, also the wall thickness of the MSM electrode. Standard resistance thermometers, which preferably can be applied, have, for example, resistance values of 100, 500 or 1000 ohm.

Figure 7:
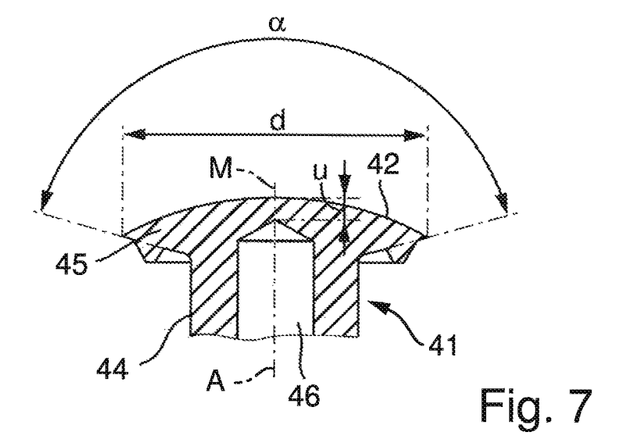
FIG. 7 is a partial view of a third electrode of the invention.
Figure 8:
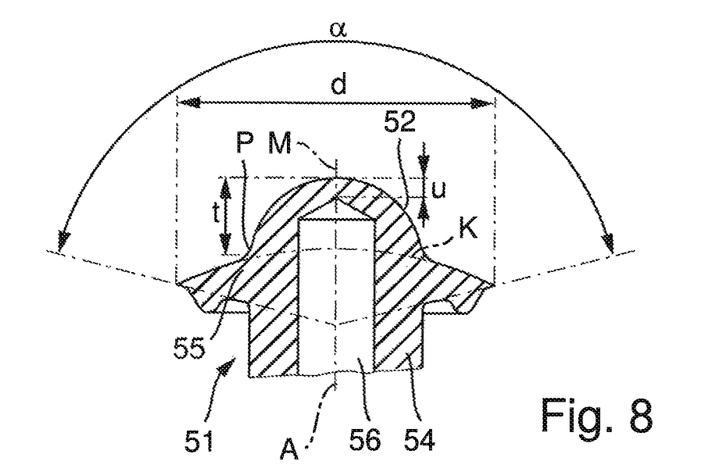
FIG. 8 is a partial view of a fourth electrode of the invention.

Although not shown in FIGS. 7-9, the terminal region of the cylindrical hollow space serves in the here shown electrodes likewise for the arrangement of the sensor platform of temperature sensors, which are embodied with constructions equal to that of temperature sensor 5 of FIG. 3.

The preferred embodiment of an electrode 24, such as it is shown in FIG. 6, will now be described in greater detail.

The electrode shown in FIG. 6 includes an electrode body 34 and an electrode head 35 and is rotationally symmetric about a longitudinal axis A.

FIG. 6 shows the electrode 24 with a preferred end surface geometry, respective the geometry of an electrode head. The end face includes a first lateral, preferably peripheral, edge section R, whose course defines a first circular arc K or parabolic curve. However, the course of the end face of this differently formed electrode head does not follow the shape of the circular arc K defined by the edge section. This first circular arc K is established by the radial curvature of the edge section R toward the midpoint M of the end face 32, especially by its initial rise, wherein the midpoint M of the end face 32 is arranged in the longitudinal direction of the electrode 24 above this first circular arc K. The angle of the circular arc K defined in such a manner amounts to, in such case, preferably less than 170°, preferably equal to or less than 160°, in order to achieve a favorable onflowing of the medium. The curvature of the end face 32 in the radial direction toward the midpoint M reaches, in such case, a point P from which an extension of positive slope occurs, wherein the separation t from the point P to the midpoint M in the direction of the longitudinal axis is greater than the wall thickness u of the electrode head 35 along the longitudinal axis A at the midpoint M of the electrode 24, respectively the end face 32.

The edge region or edge section R extends, in such case, preferably over a section extending radially towards the midpoint M of at least 2%, preferably at least 4%, especially at least 10%, of the diameter $d_{35}$ of the electrode head 35. Especially preferably, the edge section R amounts to between 2-70%, especially between 10-60%, of the diameter $d_{35}$ of the electrode head 35.

About after a third of the distance between the outermost lateral point of the end face 32 and the midpoint M of the end face 32, the end face 32 deviates from the shape of the first circular arc K in such a manner that the curvature transfers into a second section with a positive, steeper rise and, finally, in a third section, a planar area is defined up to the midpoint.

The end surface form of the electrode of FIG. 6 includes, thus, a lateral section R in the form of a shoulder, adjoined centrally by a cylindrical shape.

The end face 32 of the electrode head 24 is, in such case, preferably compared with the diameter $d_{34}$ of the electrode body 34 at least 1.2-times wider, preferably at least 1.5-times wider, especially preferably at least 1.7-times wider. In the present case, the diameter of the electrode body corresponds to the diameter of the electrode head.

The electrode head includes an annular sealing strip, respectively a material protuberance or protrusion, which extends in the radial direction beyond the wall of the pin-shaped cylindrical electrode body 34. The upper side of the annular material protrusion 36 forms, in such case, a part of the terminal end face 32 of the electrode.

In the center of the electrode head, the electrode head 32 includes a cylindrical structure, wherein the cylindrical surface extends parallel to the longitudinal axis of the electrode body 34. A base of the cylindrical structure is preferably at least in certain regions embodied planarly and extends perpendicularly to the longitudinal axis of the electrode body. This base is preferably arranged in the direction of the medium above the first circular arc K, which is defined by the edge region R of the end 32 of the electrode head 34. Since the sensor platform 31 composed of ceramic platform, metal wire and glass protective layer within the electrode likewise has a cylindrical shape and the sensor platform 31 is arranged sectionally within the cylindrical structure, an especially favorable temperature transfer occurs via the end face 32 to the resistance thermometer 25. The wall thickness u of the electrode head in the region of the cylindrical structure amounts preferably to less than the inner diameter of the cylindrical structure, preferably less than 50% of the inner diameter of the cylindrical structure, especially between 10 to 40% of the inner diameter of the cylindrical structure. Due to this small wall thicknesses, an improved temperature transfer to the resistance thermometer is obtained, wherein the wall thickness offers at the same time a sufficient mechanical protection of the resistance thermometer.

In such case, the inner diameter of the cylindrical structure 39 is preferably less than the inner diameter of the electrode body 34, especially preferably at least 1.2-times less, especially at least 1.5-times less, than the inner diameter of the electrode body 34.

Moreover, a terminally located wall section 34a of the electrode body 34 provides a contact surface, especially preferably a gold contact. Applied to this contact surface, respectively gold contact, can be cable (not shown), which establishes a signal connection with an evaluation unit.

Adjoining the electrode head 35 is the cylindrical electrode body 34. This includes a cylinder wall in certain regions with a wall thickness which is preferably less than the inner diameter of the electrode body $d_{34}$, especially preferably less than 50% of the inner diameter of the electrode body.

The electrode body 34 includes a front region, which opens directly into the electrode head and a rear region, which preferably protrudes out of the measuring tube 22. In this rear region, especially the outer wall of the electrode body 34 includes a connection location for removing a signal. This can be, for example, a solder contact location, which enables connection of a cable, which is connected with an evaluation unit (not shown), which evaluates the received voltage or electrical current level and, as a result, outputs a status signal concerning the fill state of the measuring tube. This occurs in interaction with a second electrode. The contacting of the two electrodes occurs via the medium in the case of sufficient fill state.

The electrode material of the aforementioned examples of embodiments is preferably steel.

Other less preferred variants of an electrode form are shown in FIGS. 7-9.

The advantageous effect and advantageous use of the fill level monitoring system of the invention can basically occur in all media conveying pipes or tubes, in which a medium with at least small conductivity is flowing. Other special advantages in the case of use in flow measuring devices, especially in magneto inductive flow measuring devices, will now be described.

The measured substance monitoring, also called "empty pipe detection" (EPD), by the MSM electrode can occur in various ways. Thus, it has been for a long time possible, among other things, to measure the electrical resistance between the MSM electrode and a reference electrode or the process connection, which can, for example, be equipped with ground washers, respectively ground electrodes. In such case, the electrical resistance increases, for example, in the case of measuring mineral water, very strongly, when the measuring tube transfers from the state fully filled to partially filled. In this case, air instead of water would be located at least in certain regions between the reference electrode or the process connection and the MSM electrode, so that instead of the conductivity of water the conductivity of air would enter into the resistance measurement. The corresponding impedance change at the MSM electrode is detected by the evaluation unit, which outputs from an output unit an output signal concerning the degree of filling of the measuring tube.

Starting from this per se already known MSM-technology, it is essentially an approach of the present invention to enable via the MSM electrode also a temperature measurement.

In a first embodiment, such as shown in FIGS. 1 and 4, the temperature ascertainment is enabled by performing a resistance measurement as a function of the conductivity of the medium with the MSM electrode in combination with a reference electrode and/or the process connection. The fill state of the measuring tube can be ascertained by an evaluation unit (not shown) and forwarded to an output unit (not shown). Inserted in the MSM electrode is a resistance thermometer, which has associated with the temperature of the medium a property, which can be used by the evaluation unit for determining the temperature of the medium. The temperature information can, in turn, be forwarded to the output unit. In order to obtain less measurement scatter of the temperature of the medium, it has proved favorable that the temperature probe protrudes inwardly by a few μm or mm into the measuring tube 2, 22, so that it is washed by the medium. The MSM electrode is, in such case, cylindrically constructed and includes a terminal end, which protrudes inwardly into the measuring tube.

The protruding of the MSM electrode 4, 24 into the medium leads, however, in the case of horizontal installation and conventional MSM electrode located in the uppermost region in the interior of the measuring tube, to a retarded response of the MSM, respectively a response in the case of a lower degree of filling. This can be advantageously counteracted by coating the end 12, 32 of the electrode head 15, 35 sectionally to make it electrically insulating, wherein simultaneously the thermal conductivity of the coating 13, 33 should be as high as possible. By partially insulating the end face 12, 32, especially in the region of the midpoint of the rotationally symmetric electrode head 15, 35, the medium contacts on the electrically conducting regions of the MSM electrode, which are located almost even with the wall of the measuring tube.

In a second embodiment of the invention, the MSM-function, respectively the arising of partial filling, can be detected by a jump in the measured temperature. A condition for this is that the actual temperature of the medium is known to serve as a reference. This can be registered by a second resistance thermometer arranged in the device. In this case, the electrically insulating coating of the preceding paragraph can be omitted. It is necessary, however, to have a sufficiently large temperature difference between the temperature of the medium and the temperature reigning in the partially filled measuring tube in the free space, in order to bring about the temperature jump.

In the examples of embodiments illustrated in FIGS. 1, 3 and 4, the resistance thermometer, respectively the temperature sensor 5, 25, is integrated into the MSM electrode 4, 24, wherein the electrode body 14, 34 and the electrode head 15, 35 function simultaneously as housing for the resistance thermometer.

Alternatively to arrangement in an MSM electrode, in a third embodiment, the reference electrode can have an integrated temperature sensor, wherein the mentioned reference electrode is applied secondarily for measured substance monitoring and transmits a signal, which is received by the MSM electrode. This reference electrode can likewise ascertain the temperature of the medium.

Necessary for MSM monitoring in the aforementioned examples of embodiments is that at least one of the electrodes, the MSM electrode or the reference electrode, in the case of horizontal installation, is arranged in the uppermost region of the inner wall of the measuring tube, so that an incomplete filling is immediately detectable.

In a preferred embodiment of the aforementioned embodiment, the MSM electrode is arranged on the side of the measuring tube lying opposite the reference electrode perpendicularly or inclined to the measuring tube axis on or in the inner wall of the measuring tube.

In a fourth embodiment of the invention, both the reference electrode as well as also the MSM electrode can have integrated resistance thermometers. In such case, both the reference electrode and the MSM electrode are arranged at the uppermost point of the tube cross section offset in the flow direction. With such an arrangement, for example, an accretion recognition can be performed, assuming a temperature difference between the temperature of the medium and the ambient temperature. In case of a change of the resistance between the two electrodes caused by an incomplete filling of the measuring tube, in the case of equal conditions at the electrodes, the ascertained temperatures of the temperature sensors of the MSM electrode and the reference electrode in the same time interval should equal a new equilibrium temperature. If the temperature response at one of the two electrodes is clearly slower or another equilibrium temperature is achieved, then a thermally insulating accretion can be present at this location. In order that accretion formation not occur at both electrodes in equal measure and, thus, distinguishing, respectively accretion recognizing, by temperature differences is no longer possible, corresponding precautionary measures should be taken, such as e.g. different surface structuring or coating or periodic applying of voltages to one of the two electrodes, which counteract a layer build up (ECC=electrode cleaning circuit). The effects of these measures on the temperature measurement is, of course, to be taken into consideration.

Independently thereof, temperature measurement at both the MSM electrode as well as also at the reference electrode can provide a checking of the measurement data and the output of indication of a disturbance in the case of inconsistent values.

In a fifth embodiment of the invention, supplementally to the MSM electrode and the reference electrode, also the two measuring electrodes of the magneto inductive flow measuring device can be equipped with resistance thermometers.

In such case, the four aforementioned electrodes are arranged in a preferred embodiment of the fifth embodiment in the tube cross section with an angle of 90° relative to a neighboring electrode, wherein the two measuring electrodes diametrally oppose one another.

In sectioned tube side view, the measuring electrodes can be arranged in the flow direction also before or behind the MSM electrode and the reference electrode.

The advantageous embodiment of this arrangement enables, in given cases, deductions concerning the flow profile over the tube cross section. Usually, a magneto inductive flow measuring device is designed for a rotationally symmetric flow profile. The above described arrangement of electrodes with, in each case, at least one integrated temperature sensor permits deviations from the rotational symmetry in the measuring to be taken into consideration and a lessening of their influence on the measurement results. Deviations from rotational symmetry can vary depending on type and embodiment and depend, among other things, on the measuring tube diameter.

The aforementioned arrangement of the electrodes would permit judging the rotational symmetry of the flow in the case of quick change to a medium with another temperature or in the case of introduction to the flow measuring device of two media with clearly different temperatures. Based thereon, there can occur either the output of a warning of the presence of a non-rotationally symmetric flow or a measured value correction. Necessary for the last case, however, is an empirical earlier determination of temperature distribution dependent, correction values, e.g. in a calibration method, which can be referenced at startup. The aforementioned arrangement is, in such case, of course, only one possible example of an embodiment. A deviation from rotational symmetry also is already at least registrable via a three point determination, for example, by the MSM electrode and the two measuring electrodes. In general, with rising number of measurement points along the tube circumference an increasingly better determining of the rotational symmetry is possible. Since, however, the aforementioned four electrodes in this arrangement are already provided in measuring devices, then no additional structural matching of the measuring tube and the electrode symmetry is needed but, instead, existing proven arrangements can be relied on.

Usually in a magneto inductive flow meter, the volume flow of a medium is determined. In a sixth embodiment of the invention, an option is to derive from the temperature measurement, for example, between the reference electrode and the MSM electrode or between the reference electrode, the MSM electrode and the two measuring electrodes, by temperature measurement at known density of the medium, information concerning average density. This permits deductions concerning mass flow of the medium.

In such case, e.g. by numerical simulation, in certain cases, a relationship between the temperature distribution of the flow in the region of the measuring tube wall and the density distribution of the medium can be ascertained and corresponding correction functions derived.

For the aforementioned embodiment, the electrode form of both the MSM electrode, the reference electrode and/or the measuring electrodes can be adapted and optimized. Various preferred embodiments of the electrodes will now be described in greater detail based on FIGS. 7-9.

The electrodes individually illustrated in FIGS. 7-9 are rotationally symmetrically constructed with an electrode body 44, 54 and an electrode head 45, 55 with an end face 12, 32. The electrodes have an inner cylindrical hollow space 46, 56. Terminally arranged in this cylindrical hollow space 46, 56 is the temperature sensor, respectively the resistance thermometer 5, 25, especially the layering 11, 31 of ceramic platform 6, metal wire 7 and glass protective layer 10, so that the temperature on the end face is detectable via the resistance thermometer 5, 25.

FIG. 7 shows a first preferred electrode form of an MSM electrode 41 or reference electrode, such as is applied so far already in magneto inductive flow measuring devices. This electrode includes a circular arc shaped end face 42. The angle α of the circular arc amounts, in such case, preferably to less than 170°, preferably less than 160°, in order to achieve a favorable temperature response behavior for an end face 42 having a circular arc shape. The temperature response behavior is less advantageous compared with other further developed forms. The advantage of this electrode form is, however, that it has a very small flow resistance.

FIGS. 8 and 9 show other especially preferred embodiments of end surface geometry of an electrode, respectively an electrode head. The embodiments illustrated in these figures have end faces with, in each case, a first lateral, preferably peripheral, edge section, whose curvature defines a first circular arc A or parabolic curve. In contrast to FIG. 7, the course of the end faces of these differently formed electrode heads does not continue the shape of the circular arc A defined by their edge section.

The first circular arc is established by the radial course of the edge sections toward the midpoint of the end face, especially by its beginning rise, wherein the midpoint of the end face is arranged above this first circular arc. In other words, the midpoint of the end face protrudes above the circular arc.

FIG. 8 shows a second preferred electrode form of an MSM electrode or reference electrode, and represents a further development of the aforementioned variant. The course of the end face in the radial direction toward the midpoint M reaches, in such case, a point P, where an extension of positive slope occurs, wherein the separation t of the point P from the midpoint M in the longitudinal axis direction is greater than the wall thickness u of the respective electrode head along the longitudinal axis A at the midpoint M of the electrode The end face of the electrode includes a midpoint. Starting from the points of the end face spaced farthest from the midpoint of the end face, the course of the end face describes, first of all, a first circular arc with a first central angle. This curvature extends preferably over an edge section radially spaced from the midpoint of the end face and accounting for at least 10% of the end face, preferably at least 20% of the end face, especially between 25-60% of the end face. The midpoint of the end face protrudes from the first circular arc in the longitudinal direction of the pin-shaped electrode.

In such case, the particular embodiment of the course of the end face shown in FIG. 8 describes a second circular arc shape with a second central angle. The second central angle is, in such case, less than the first central angle. The electrode in FIG. 7 has, in the sectional view, at its end, the shape of a circular arc with a certain radius and angle. In FIG. 8, there are two curvature changes. The region around point P could likewise be considered as a circular arc with less radius and angle range, wherein the midpoint of this circle would be outside of the electrode (concave). Thereat then a further curvature change takes place. The upper end is, for example, in turn, embodied as a circular arc with midpoint within the electrode (convex). The radius, in such case, is clearly less than the radius of the first circular arc. In contrast, the angle can be even greater than that of the first circular arc. Of course, also other contours in the form of circular arcs are conceivable. The goal of optimizing is to achieve a good coupling of the temperature sensor to the medium. Features promoting this are a thin wall thickness and a significant protruding into the medium. The separation from the medium averaged over the solid angle should thus be as small as possible. Boundary conditions for this can be derived from considerations for mechanical loadability, for manufacturability and for the influence on the flow profile. A corresponding curvature change from convex to concave can also be observed in the case of the examples of embodiments FIGS. 1-6 and 9.

FIG. 9 shows other preferred electrode shapes of MSM electrodes or reference electrodes (variants B-E). These electrodes shapes give better temperature response behavior than the variant shown in FIG. 7. Also in the case of these examples of embodiments, the edge section radially spaced from the midpoint of the end face describes a first circular arc shape with a first central angle. In the variants B and C, the region of the midpoint M of the end face assumes a second circular arc shape with a second central angle, which second central angle preferably amounts to less than a fourth, especially preferably less than an eighth of the first central angle of the first circular arc shape.

FIG. 9 shows additionally two electrode shapes further preferred compared with the variants A-C and having a cylindrical region of the end face. In such case, the course of a first lateral section R of the electrode directed toward the midpoint defines, such as shown, for example, also in the case of the example of an embodiment of FIG. 3, a first circular arc. About at half the distance between the outermost lateral point of the end face and the midpoint of the end face, the end face deviates from the shape of the first circular arc in such a manner that a second section Z of the end face is arranged in the longitudinal direction of the electrode below the circular arc. In this second section, the end face has preferably a negative rise relative to the midpoint. This second section of the end face then transitions into a third section Y with a positive rise, and from there, finally, into a fourth section X, which is a flat area in to the midpoint.

The end faces of the electrode shapes of the variants B-E of FIG. 9 have, thus, a lateral section R in the form of a shoulder, with the variants D and E having an annular groove Z and, finally, in the center an adjoining cylindrical shape Y and X.

The FIG. 9 electrode form variant E, which corresponds to the example of an embodiment of FIG. 3, is distinguished, compared with the other variants of electrode shapes shown in FIG. 9, by an especially good measuring performance, especially as regards temperature response behavior and measurement error at equilibrium. Therefore, this electrode form is especially preferred.

The electrodes of the aforementioned examples of embodiments can have, in such case, an insulating coating 13 in a region, which is arranged around the midpoint, in FIGS. 3 and 9 especially the end face of the cylindrical structure 19 and, in given cases, partially its cylindrical surface. Advantageously in such case, a polycrystalline diamond coating can be provided, which combines a very high thermal conductivity with electrical insulation and is chemically, thermally and mechanically highly durable.

Fundamentally, all aforementioned examples of embodiments can be used in measuring tubes of flow measuring devices, which are made completely of synthetic material, e.g. polyethylene, or completely of metal, e.g. stainless steel. In the latter case, however, depending on construction of the device, a sufficient thermal isolation of the temperature electrode from the measuring tube must be provided.

Especially preferable are, however, measuring tubes of metal with an inner lining of synthetic material, especially a plastic liner. This inner lining enables a thermal isolation of the measured medium from the metal pipe, whereby a thermal decoupling of the temperature electrode from the measuring tube is achieved. Important, in such case, is that the electrodes are insulated, e.g. by the lining, from the "colder" measuring tube; otherwise significant measurement errors can be experienced.

Moreover, a two electrode arrangement of the fill level monitoring system enables an additional ascertaining of the contamination state of the electrodes in the case of industrial water.

Preferably, the selection of a suitable limit value of the degree of filling can depend on the tube diameter.

In the case of lesser tube diameters, the MSM electrode protrudes due to its geometry with reference to the degree of filling by a greater % of the measuring tube diameter into the measuring tube than in the case of larger tube diameters.

Therefore, a preferred gradation can be made.

In the case of a tube nominal diameter DN 2 to 8, the limit value of the degree of filling is preferably selected from a range of 55 to 99%.

In the case of a tube nominal diameter DN 8 to 200, the limit value of the degree of filling is preferably selected from a range above 75%.

In the case of a tube nominal diameter DN 200 to 1000, the limit value of the degree of filling is preferably selected from a range above 95%.

In the case of a tube nominal diameter DN 1000 to 2000, the limit value of the degree of filling is preferably selected from a range above 99%.

In the case of a tube nominal diameter DN above 2000, the limit value of the degree of filling is preferably selected from a range above 99.6%.

The invention claimed is:

1. A flow measuring device comprising:
a measuring tube; and
an apparatus for ascertaining flow velocity and/or volume flow of a medium in the measuring tube, wherein:
the flow measuring device includes a fill level monitoring system, comprising:
at least one electrode for monitoring the fill level of a medium flowing in a pipe or tube, and at least one electrode has an integrated temperature sensor; and an evaluation unit, which is embodied for monitoring the degree of filling of the tube and transmits a warning signal when the degree of filling subceeds a limit value, especially a degree of filling of less than 55% of the tube diameter, which fill level monitoring system includes at least one electrode with an integrated temperature sensor, which electrode is arranged in the measuring tube or in a process connection connected to the measuring tube, which electrode is especially embodied for determining temperature and fill level of the medium in the measuring tube;
the fill level monitoring system includes an evaluation unit for monitoring the degree of filling of the measuring tube and which evaluation unit transmits a warning signal when the degree of filling subceeds a limit value, especially a degree of filling of less than 55% of the tube diameter.

2. The flow measuring device as claimed in claim 1, wherein:
the flow measuring device is embodied as a magneto inductive flow measuring device and has two measuring electrodes especially for flow measurement as well as another electrode belonging to the fill level monitoring system.

* * * * *